United States Patent

McIntyre

[11] 4,097,012
[45] Jun. 27, 1978

[54] MOUNTING BRACKET ASSEMBLY
[75] Inventor: Vernon E. McIntyre, Akron, Ohio
[73] Assignee: Wadsworth Equipment Company, Akron, Ohio
[21] Appl. No.: 711,855
[22] Filed: Aug. 5, 1976
[51] Int. Cl.² .................................................. B60R 7/00
[52] U.S. Cl. ........................................ 248/23; 248/16; 248/278; 224/42.42 R
[58] Field of Search ............... 248/278, 279, 183, 485, 248/12, 16, 23, DIG. 9, 70, 284, 287, 270, 207; 224/29 R, 42.42 R, 42.44, 42.45 R

[56] References Cited

U.S. PATENT DOCUMENTS

| | | | |
|---|---|---|---|
| 2,673,059 | 3/1954 | Lustig | 248/16 |
| 2,947,306 | 8/1960 | Culkin | 248/287 |
| 2,969,231 | 1/1961 | Mills | 248/183 |
| 3,550,001 | 12/1970 | Hanley | 224/42.42 R |
| 3,658,219 | 4/1972 | Van Ordt | 224/42.42 R |
| 3,685,708 | 8/1972 | Herrington | 248/23 |
| 3,964,612 | 6/1976 | Skilliter et al. | 224/42.42 R |

FOREIGN PATENT DOCUMENTS

| | | | |
|---|---|---|---|
| 1,402,147 | 5/1965 | France | 248/270 |
| 1,901,685 | 9/1970 | Germany | 248/279 |
| 112,676 | 4/1968 | Norway | 248/284 |

Primary Examiner—Marion Parsons, Jr.
Attorney, Agent, or Firm—Reese Taylor

[57] ABSTRACT

A mounting bracket assembly is disclosed which is suitable for mounting a radio or similar appliance either on a flat planar surface or over the drive shaft hump of a vehicle. The assembly includes a base adaptable to be secured to either a flat or curved surface and a U-shaped first support member releasably and adjustably secured to the base for pivotal movement about an axis normal to the plane of the base. The upstanding legs of the U-shaped first support member have through apertures therein and a pair of opposed L-shaped second support members are also provided. These second support members each have an elongate slot in their long legs so that they may be releasably and adjustably secured to the legs of the first support member for adjustment both along the longitudinal axis of the leg and about a horizontal axis. The remaining legs of the L-shaped second support members have elongate slots in them for adjustable attachment to the radio or other appliance.

2 Claims, 4 Drawing Figures

MOUNTING BRACKET ASSEMBLY

BACKGROUND OF THE INVENTION

This invention relates in general to mounting bracket assemblies and, in particular, to an assembly adapted to be secured either to a flat planar surface or to an arcuate surface and to support an appliance such as a radio, for example.

DESCRIPTION OF THE PRIOR ART

There are a number of mounting brackets known in the prior art and specifically adapted to mount radios or similar appliances to various surfaces.

Some of these such as, for example, Van Ordt U.S. Pat. No. 3,658,219, are capable of adjustment in one direction, but none known to applicant are capable of adjustment in a plurality of directions as is the case with the invention herein. Such adjustment is considered desirable to enable the user of the radio to enjoy the most efficient and comfortable use thereof.

Furthermore, these devices are normally designed to be mounted in a vehicle, and many have a built-in curved or arcuate base suitable for mounting on the hump caused by the drive shaft of the vehicle. An example of this type device may be seen in Hanley, U.S. Pat. No. 3,550,001. However, because of this feature, they are not flexible in that considerable difficulty would be encountered in mounting such a device on a flat planar surface such as the wall of a camper or other vehicle, for example.

BRIEF SUMMARY OF THE INVENTION

It has been found that the above-noted disadvantages can be overcome by providing a mounting bracket assembly capable of being mounted on either flat planar or arcuate surfaces and capable of being adjusted in a variety of directions.

It has been found that this can be accomplished by providing a base member which can be readily deformed to conform to the support surface, regardless of its configuration, and by providing a U-shaped first support member which can be releasably and movably secured to the base so that the U-shaped member can rotate about its point of attachment for adjustment and access purposes. It has further been found that a pair of opposed L-shaped second support members can be provided and secured to the projecting legs of the first support member so that adjustment can be achieved in a vertical direction and also again about the point of support so that true three-direction adjustment can be achieved.

Accordingly, production of an improved bracket assembly of the character above described becomes the principal object of this invention with other objects thereof becoming more apparent upon a reading of the following brief specification, considered and interpreted in view of the accompanying drawings.

OF THE DRAWINGS

BRIEF DESCRIPTION OF THE PREFERRED EMBODIMENT

Figure 1:
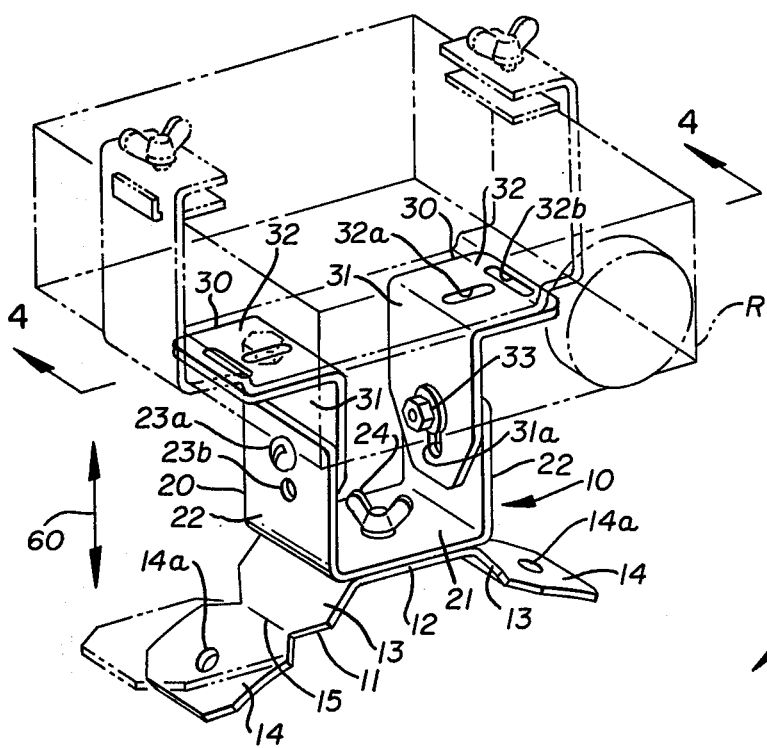
FIG. 1 is a perspective view showing the improved bracket assembly.

Referring first to FIG. 1, it will be noted that the improved bracket assembly, generally indicated by the numeral 10, includes a base 11, a first support member 20, and a pair of second support members 30, 30.

The base 11 includes a central support portion 12 and depending leg members each of which may be divided into two sections 13 and 14. The outermost leg sections 14, 14 each have through apertures 14a, 14a for mounting purposes, as will be described.

As noted above and shown in FIG. 1, the leg members of the base are actually formed into two sections 13 and 14 with a score or bend-line 15 interconnecting them. This enables the outboard end members 14, 14 to be deformed or bent about this line to conform to the surface on which the base is to be mounted. Thus, for example, if the mounting were to be on a flat planar surface, the end members 14, 14 would be bent to the condition shown in broken lines in FIG. 1. On the other hand, if the mounting were to be on an arcuate surface such as, for example, the hump formed by the drive shaft of a vehicle, they would be in the full line position of FIG. 1 so that maximum flexibility and adaptability, as far as the mounting surface, is achieved.

Figure 3:
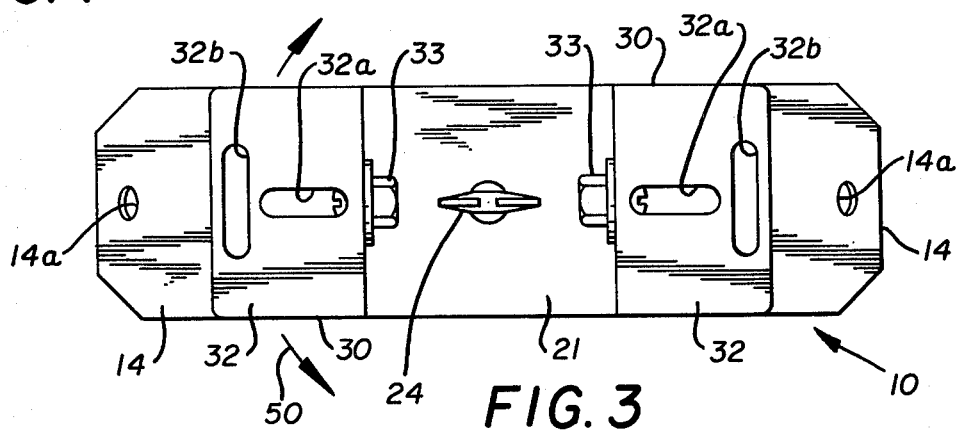
FIG. 3 is a top plan view.

The first support member 20 is a U-shaped member having a base 21 and opposed upstanding legs 22, 22. These upstanding legs have at least two through apertures 23a and 23b disposed along the longitudinal axis of the leg to provide for a range of adjustment, as will be described. The base 21 of the first support member 20 may be releasably and adjustably secured to the central support portion 12 of the base 11 by the wing nut 24. This permits disassembly, if desired; but also permits adjustment of the device about the axis of the wing nut or, in other words, in the direction of the arrow 50 (see FIG. 3).

This has particular utility, for example, when the device is mounted over the drive shaft hump of an automobile or other vehicle, since the entire assembly can be swung to face either the driver or passenger, as desired.

The second support members 30, 30 are L-shaped in configuration with the long legs 31, 31 thereof, each having an elongate slot 31a disposed along the longitudinal axis thereof. This permits attachment to the legs 22, 22 of the first support member W by nut and bolt means 33, 33, and also permits adjustment in the direction of the arrow 60 or vertically or pivotally in the direction of the arrow 40 so that the device may be raised or lowered and also swung at an angle with regard to the horizontal to facilitate reading of the face of radio R.

Figure 4:
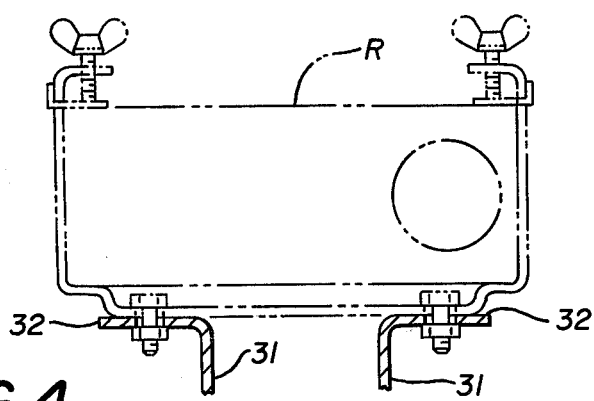
FIG. 4 is a sectional view taken along the line 4—4 of FIG. 1.

The short legs of each of the second support members 30, 30 designated by the numerals 32, 32, each have a first slot 32a extending along the longitudinal axis of the leg, and a second slot 32b extending at right angles thereto. These are attached to the usual radio engaging bracket of the radio or other appliance. Utilization of the slots 32a and 32b, of course, makes it possible to accommodate varying sizes of radios or other appliances. The radio R and the one form of conventional support bracket have been illustrated in phantom in FIGS. 1 and 4 to show their relationship to the mounting bracket assembly of this invention.

Accordingly, it will be seen how the improved mounting bracket assembly, which is the subject of this application, is adaptable to mounting on either planar or arcuate surfaces by virtue of the flexibility and adjustability of the legs 14, 14 of the base 11.

In use of the improved mounting bracket assembly, the legs of the base 12 will first be deformed to conform to the support surface, as described above. Following this, the base may be secured to the supporting surface by screws or bolts (not shown).

First support member 20 is then attached to base 11 by wing nut 24. In this fashion, member 20 and base 11 may be securely interconnected, but movement of member 20 about a vertical axis in the direction of arrow 50 is possible.

Second support members 30, 30 may then be secured to the legs 22, 22 of first support member 11 by nut and bolt assemblies 33, 33. A number of adjustments are possible with this interconnection.

Figure 2:
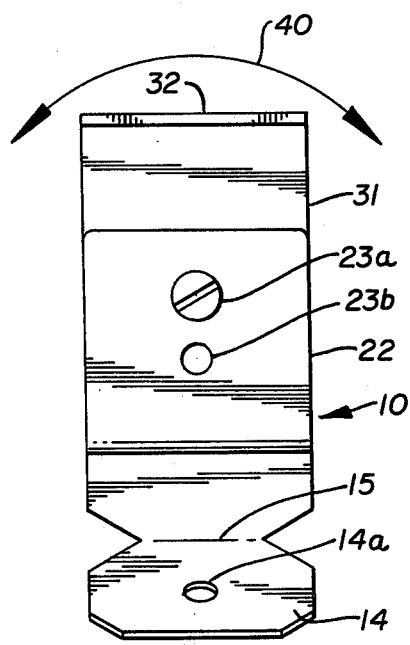
FIG. 2 is a side elevational view taken from the right of FIG. 1.

First, support members 30, 30 are adjustable about a horizontal axis or in the direction of arrow 40 (see FIG. 2). Second, members 30, 30 are adjustable in a vertical plane in the direction of the arrow 60 (see FIG. 1) by virtue of slots 31a, 31a. Third, a still further range of adjustment in the direction of arrow 60 is made possible by selecting between the apertures 23a, 23b in the legs of the first support member 11.

Furthermore, the bracket structure permits adjustment and movement of the assembly and the device carried by the assembly in a plurality of directions while retaining a secure mounting for the appliance. Thus, the adjustment features above described permit movement about a vertical axis in the direction of arrow, about a horizontal axis in the direction of arrow 40, and in a vertical plane in the direction of aarow 60 so that access to radio R is greatly facilitated.

While a full and complete description of the invention has been set forth in accordance with the dictates of the Patent Statutes, it should be understood that modifications can be resorted to without department from the spirit hereof or the scope of the appended claims.

For example, it will be noted that the invention has been primarily described as being used with a radio R, but it is believed apparent that other appliances or other articles such as radio-telephones, compasses, stereos or depth finders could be mounted thereon.

What is claimed is:

1. A mounting bracket assembly, comprising:
   (A) a unitary base having
      (1) a central planar support portion, and
      (2) integral opposed leg portions projecting therefrom;
   (B) a first, generally U-shaped support member having its base adjustably secured to said planar support portion of said unitary base for movement about an axis normal to the plane thereof and its opposed legs projecting normally to said plane;
   (C) a pair of opposed, generally L-shaped second support members, each being
      (1) releasably secured to one leg of said first support member for movement
         (a) about an axis normal to the plane of the legs of said support member, and
         (b) in a plane lying parallel to the plane of the legs of said support member;
   (D) the legs of said first support member each have a plurality of vertically aligned through apertures lying along the longitudinal axis thereof;
   (E) said second support members having first and second legs;
   (F) said first legs of each of said second support members having an elongate slot therein lying along the longitudinal axis of said leg for registry with said apertures of said first support members; and
   (G) said opposed leg portions of said unitary base each being divided into first and second sections by a locally weakened area of reduced cross-section and said second sections defining the terminus sections and being deformable relatively of said first sections.

2. The assembly of claim 1, wherein said second leg of each of said second support members has a first elongate slot lying along the longitudinal axis thereof and a second elongate slot extending normally to the axis of said first elongate slot.

* * * * *